3,271,170
TRACTION INCREASER COMPRISING POLYDIHYDROQUINOLINES AND ROSIN
Richard E. Ahlberg, Bay City, and Joseph E. Schrems, Saginaw, Mich., assignors to The Dow Chemical Company, Midland, Mich., a corporation of Delaware
No Drawing. Filed Dec. 30, 1963, Ser. No. 334,609
7 Claims. (Cl. 106—36)

This invention relates to a novel method for increasing the traction of a rubber surface on ice or hard-packed snow. It also relates to a new composition which is particularly effective when used for this purpose.

In many areas of the world, cold weather renders travel on foot or by automobile hazardous and uncertain because ice and snow make roads and walks slippery. Automobiles, in particular, often become stuck because of insufficient traction of the tires on an icy or snow-covered street. Conventional remedies include the fastening of tire chains to the driving wheels and sanding or salting the slippery area. While these methods are fairly effective, they are bothersome and are occasionally impractical. For example, sand or salt must sometimes be applied to a considerable area to extricate a stranded car. Since sand and salt do not stick to the tire, the wheels are likely to start spinning ineffectually again as soon as a new slippery spot is encountered. It would therefore be of considerable advantage in such situations to have available a material which could be applied to the tires to increase their traction on ice and which would also adhere to the rubber for an appreciable length of time, thereby giving more than a mere momentary purchase on the slippery ground.

A composition has now been found which, when applied to a rubber surface, forms a strongly adherent gummy layer on the rubber upon contact with water, thereby greatly increasing the traction of the rubber on ice. This composition is essentially a solution in a water-miscible aliphatic organic solvent of a material consisting essentially of about 20–100% by weight of polymerized 2,2,4-trimethyldihydroquinoline, commercially available under the trademark Agerite Resin D, and 80–0% of wood rosin. Polymerized 2,2,4-trimethyldihydroquinoline is readily prepared by heating the monomer at about 100–150° C. in the presence of aqueous hydrochloric acid according to a procedure such as shown by Reuter, U.S. Patent 2,451,174. Surprisingly, it has been found that solutions of mixtures of about 10–70% by weight of rosin and 90–30% of Agerite Resin D give considerably better results than solutions of either component alone. Solutions containing as dissolved solids a mixture of 20–60% by weight of rosin and 80–40% of Agerite Resin D give best results.

By the term water-miscible aliphatic organic solvent is meant an oxygen-containing lower aliphatic solvent which is substantially miscible with water such as a lower alkanol, a ketone such as acetone or methyl ethyl ketone, a glycol such as ethylene glycol or propylene glycol, or a glycol ether such as the lower alkyl monoether of ethylene or propylene glycol. Mixtures of these solvents may be employed. Preferably, the solvent is lower alkanol. By lower alkanol is meant an alkanol of one to three carbon atoms. The commonly available alcohols in this class are methanol, ethanol, and isopropanol. Methanol is preferred. Mixtures of these are also included. The solvent may include a small amount of water such as that present in 95% ethanol.

The composition of this invention can be applied by any convenient means to a vehicle tire, rubber footwear, or other such rubber surface where increased traction on ice or snow is needed. Plastic squeeze bottles or aerosol cans which dispense the contents as a spray are particularly effective. A solution of any appreciable concentration will offer some increase in traction and concentrations up to saturated solutions can be used to advantage. Solutions containing about 20–70% by weight of total dissolved solids are preferred. When the composition is packaged in a pressurized aerosol can, a fugitive propellant is also present, but this material is vaporized away upon dispensing of the contents and it has no effect on the action of the solution.

The composition can be employed at any temperature where traction on ice is likely to be a problem. Even though the prevailing temperature may be well below freezing, solvent remaining in the applied solution causes sufficient melting of ice with which it comes in contact to precipitate the necessary gummy solid. Friction and pressure on the ice also cause some melting.

In the examples which follow, there are given data which were obtained from a test apparatus as described below. The traction-measuring device used was essentially a wheel on which was mounted an inflated rubber tire 10 inches in diameter and having a conventional tire treat 2 inches in width, the tread of the tire resting on a smooth-surfaced block of ice rigidly contained in a horizontal flat tray which in turn rested on a platform of rollers permitting movement of the tray to and fro without appreciable resistance. The wheel was connected by a variable speed drive system to a motor and the ice tray was connected at one end to a spring scale which registered in pounds the thrust imparted on the tray by contact of the rotating wheel on the ice surface. There was provision for loading known weights on the axle of the wheel.

Tests were conducted at an ice temperature of 5° F. Initial or static friction was measured by the maximum pull in pounds recorded by the scale when the wheel was started rotating. Kinetic friction was measured by the reading on the scale at a constant wheel speed of 110 revolutions per minute. Coefficients of static and kinetic friction were then calculated from these values by dividing the corresponding scale reading by the load in pounds on the tire. Values given in the examples are averages obtained in this way from several tests, usually three in each case. These values were obtained for different loads on the test wheel for most formulations. In testing the various liquid formulations, the clean tire tread was sprayed with the formulation to provide a uniform coating of the gummy precipitate when the tire was rotated on the ice. This coating was removed by thorough cleaning of the tread after each test had been completed.

*Example 1*

The following values were obtained by using a weight of 126 lbs. on the test wheel. The solutions were all 50% by weight of solids in methanol solution.

| Solids, Wt. Percent Composition | | Coefficient of Kinetic Friction |
|---|---|---|
| Rosin | Agerite Resin D | |
| 0 | 100 | 0.123 |
| 20 | 80 | 0.151 |
| 30 | 70 | 0.161 |
| 40 | 60 | 0.164 |
| 70 | 30 | 0.139 |
| 100 | 0 | 0.09 |

It is seen from the above test values that solutions where the solids contained 30–90% by weight of Agerite Resin D gave significantly higher friction than solutions of either solid component alone.

Example 2

A solution in methanol of a mixture of 40% by weight of wood rosin and 60% of Agerite Resin D was made up to a concentration of 50% by weight of total solids. This formation was evaluated as described above using various weights on the test wheel. The values obtained are compared with those found when nothing was applied to the test tire and when sand was scattered on the ice surface.

| Material Applied | Coefficient of Kinetic Friction | | |
|---|---|---|---|
| | 88 lbs. | 126 lbs. | 164 lbs. |
| Agerite Resin D  Rosin | 0.19 | 0.16 | 0.15 |
| Sand | 0.13 | 0.12 | 0.12 |
| Nothing | 0.04 | 0.03 | 0.03 |

Example 3

Coefficients of static friction were determined as previously described using different weights on the test wheel. The test solution contained 15% by weight of rosin and 35% of Agerite Resin D in methanol.

| Material Applied | Coefficient of Kinetic Friction | | |
|---|---|---|---|
| | 88 lbs. | 126 lbs. | 164 lbs. |
| Agerite Resin D  Rosin | 0.38 | 0.28 | 0.24 |
| Nothing | 0.08 | 0.07 | 0.07 |

Similar values are obtained when some or all of the methanol solvent used in the formulations shown in the above examples is replaced with an equal weight of another water-miscible lower aliphatic solvent such as previously described.

We claim:
1. A method for increasing the traction of a rubber surface on ice and snow which comprises applying to said rubber surface a liquid composition which consists essentially of a solution in a substantially water-miscible lower aliphatic organic solvent of a material consisting essentially of about 20–100% by weight of polymerized 2,2,4-trimethyldihydroquinoline and about 80–0% of rosin.
2. The method of claim 1 wherein the liquid composition is a solution in a lower alkanol of a mixture of 30–90% by weight of polymerized 2,2,4-trimethyldihydroquinoline and 70–10% of rosin.
3. The method of claim 2 wherein the lower alkanol is methanol.
4. A liquid composition for application to a rubber surface to increase the traction thereof on ice and snow which consists essentially of a solution in a substantially water-miscible lower aliphatic organic solvent of a mixture of about 10–70% by weight of rosin and about 90–30% of polymerized 2,2,4-trimethyldihydroquinoline.
5. The composition of claim 4 wherein the solvent is a lower alkanol.
6. The composition of claim 5 wherein the lower alkanol is methanol.
7. The composition of claim 6 wherein the methanol solution contains about 20–70% by weight of dissolved solids.

References Cited by the Examiner

UNITED STATES PATENTS

| | | | |
|---|---|---|---|
| 2,451,174 | 10/1948 | Reuter | 260—88 |
| 2,718,517 | 9/1955 | Harris | 260—88.3 |
| 2,921,918 | 1/1960 | Mooney | 106—36 |

FOREIGN PATENTS

| | | |
|---|---|---|
| 307,666 | 5/1933 | Italy. |
| 795,497 | 5/1958 | Great Britain. |

LEON J. BERCOVITZ, *Primary Examiner.*

F. E. McKELVEY, *Assistant Examiner.*